United States Patent [19]

Gawer et al.

[11] Patent Number: 4,542,766

[45] Date of Patent: Sep. 24, 1985

[54] OIL-FLOW REGULATOR FOR VACUUM PUMPS IN MILKING SYSTEMS

[75] Inventors: Klaus-Peter Gawer, Ahlen; Olaf Suhr, Oelde, both of Fed. Rep. of Germany

[73] Assignee: Westfalia Separator Ag, Oelde, Fed. Rep. of Germany

[21] Appl. No.: 599,399

[22] Filed: Apr. 12, 1984

[30] Foreign Application Priority Data

Apr. 30, 1983 [DE] Fed. Rep. of Germany ....... 3315748

[51] Int. Cl.³ ................... F16K 37/00; F16N 23/00
[52] U.S. Cl. ........................... 137/559; 137/550; 137/DIG. 8; 251/285; 184/6.14; 184/29; 184/82; 138/45
[58] Field of Search ............ 251/61.5, 122, 285; 137/559, DIG. 8, 550; 184/6.14, 6.24, 29, 82; 138/45, 46

[56] References Cited

U.S. PATENT DOCUMENTS

| | | | |
|---|---|---|---|
| 256,229 | 4/1882 | Lonergon | 184/82 |
| 1,038,889 | 9/1912 | Hoofor | 184/29 |
| 1,515,648 | 11/1924 | Arnold | 137/DIG. 8 |
| 2,719,603 | 10/1955 | Le Clair | 184/29 |
| 3,599,753 | 8/1971 | Walsh | 184/29 |
| 3,693,757 | 9/1972 | Callahon et al. | 184/29 |
| 4,263,029 | 4/1981 | George | 184/6.24 |

FOREIGN PATENT DOCUMENTS 1440901 6/1976 United Kingdom ......... 137/DIG. 8

OTHER PUBLICATIONS

Alfa-Laval, Vakuum-Pumpe 18LH, German Technical Data Report, 1983.
Westfalia Separator, Westfalia Separator AG, German Technical Data Report, 1983.

Primary Examiner—A. Michael Chambers
Attorney, Agent, or Firm—Sprung; Horn, Kramer & Woods

[57] ABSTRACT

In an oil-flow regulator for vacuum pumps in milking systems, the amount of oil to be introduced is determined by the dimensions of an annular gap between a valve cone and a restrictor. The valve cone is attached to a diaphragm between the oil chamber and a partial-vacuum chamber that communicates with the suction line to the vacuum pump. When the vacuum pump is turned on, a partial vacuum builds up in the partial-vacuum chamber, forcing the diaphragm and the valve cone upward until the valve cone impacts against an axially adjustable stop. This establishes the oil flow. When the pump is turned off, the partial vacuum in the partial-vacuum chamber cancels out again, the valve cone blocks off the restrictor, an oil flow is interrupted. No oil can flow into the catch chamber when the pump is turned off and lead to an excessive rate of flow and excess oil consumption.

6 Claims, 1 Drawing Figure

U.S. Patent   Sep. 24, 1985   4,542,766
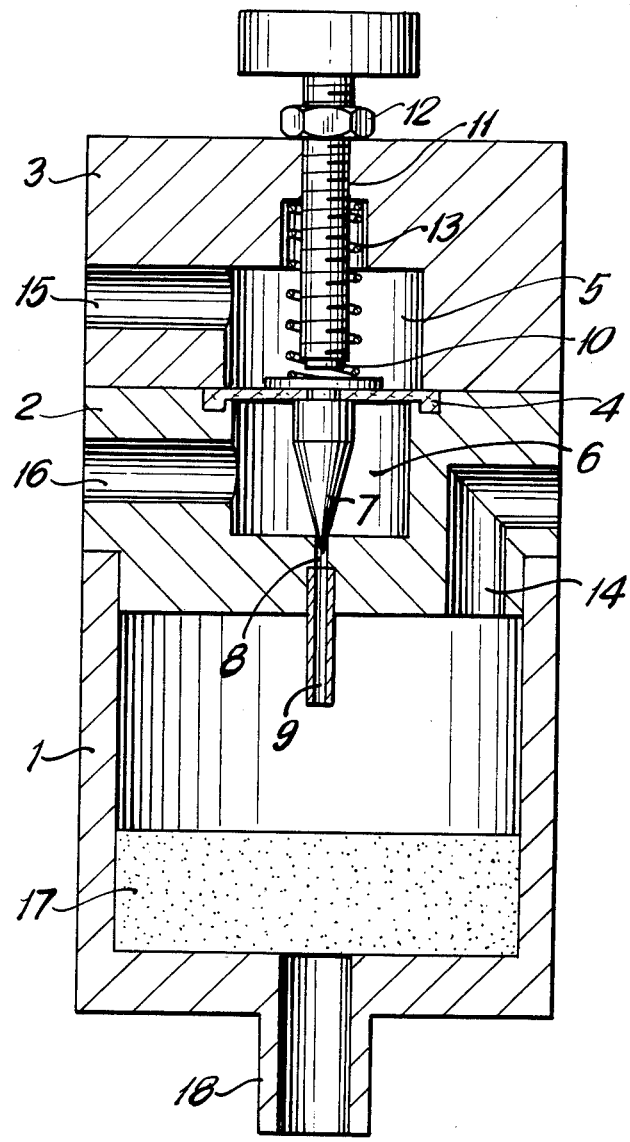

OIL-FLOW REGULATOR FOR VACUUM PUMPS IN MILKING SYSTEMS

BACKGROUND OF THE INVENTION

The present invention relates to an oil-flow regulator for vacuum pumps in milking systems in which the amount of oil to be introduced flows out of an oil chamber into an aerated catch chamber through an annular gap between a valve cone and a restrictor associated with the cone and at least one oil line leads from the catch chamber to the the vacuum pump.

Oil-flow regulators of this type, in which the amount of oil to be introduced is established by varying the distance between the valve cone and the restrictor, are known. To prevent oil from continuing to flow into the vacuum pump once the pump has been turned off, the oil-flow regulator must be lower than the site of lubrication at the vacuum pump so that the oil will be suctioned out of the catch chamber by the partial vacuum produced by the pump only when the pump is in operation. The catch chamber, however cannot be prevented from filling up with oil once the pump has been turned off, and this oil will be lost when the pump resumes operation.

Since the amount of oil consumed by the vacuum pumps is a basic parameter of the operating costs of milking systems, obtaining the lowest possible consumption is especially significant. Still, satisfactory oil flow must simultaneously always be ensured, and this is accomplished in particular by positioning the regulator where it will always be visible so that that dripping can always be monitored. This is impossible, however, with known oil-flow regulators because they always have to be positioned so low.

SUMMARY OF THE INVENTION

The object of the present invention is to provide an oil-flow regulator of the aforesaid type that can be placed at any level and in which no oil is lost when the vacuum pump is turned off.

This object is attained in accordance with the invention in that the valve cone is attached to a diaphragm between the oil chamber and a partial-vacuum chamber that communicates with the suction line.

When the pump is turned on and partial vacuum produced in the suction line from the pump, partial vacuum will also be produced in the the partial-vacuum chamber, lifting the diaphragm and the valve cone that is attached to it. Oil can now flow into the catch chamber through the annular gap that forms between the valve cone and the restrictor. The upward motion of the valve cone is limited by a stop that is positioned such that the desired amount of oil can in this state flow through the restrictor.

The valve-cone stop can be positioned in a practical embodiment such that it can be displaced axially, the amount of oil flowing out can be adjusted to prevailing operating conditions.

To ensure reliable closure of the restrictor when the vacuum pump is turned off, a compression spring is preferably provided to force the valve cone into the closure position.

A filter is provided in another practical embodiment in the aerated catch chamber to keep contaminants in the oil or air away from the sites of lubrication.

The housing of the catch chamber is made, in a further practical embodiment out of a transparent material to allow unobjectionable functioning of the oil-flow regulator to be easily monitored.

BRIEF DESCRIPTION OF THE DRAWINGS

A preferred embodiment of the invention will now be described with reference to the attached drawing, in which the FIGURE is a partial sectional view of the regulator according to the invention.

DETAILED DESCRIPTION OF THE INVENTION

A catch chamber 1 is fastened to an intermediate piece 2. A diaphragm 4 is securely stretched between top 3 and intermediate piece 2, separating a partial-vacuum chamber 5 in top 3 from an oil chamber 6 in intermediate piece 2. A valve cone 7 is securely attached to diaphragm 4 and, in its lower position, blocks off a restrictor 8 that communicates with catch chamber 1 through a drop tube 9. The upper position of valve cone 7 is limited by a stop 10 that can be axially displaced along threaded section 11 and is retained in the established position by a counternut 12. A compression spring 13 forces valve cone 7 into restrictor 8 in the rest state. Catch chamber 1 communicates with the atmosphere through a channel 14. The connection 15 to partial-vacuum chamber 5 communicates with a suction line, not illustrated, of a vacuum pump, whereas the connection 16 to oil chamber 6 leads to a reservoir, not illustrated, of lubricating oil.

A filter 17 in catch chamber 1 covers the oil drain 18 leading from the catch chamber, and the oil drain communicates with the sites of lubrication, not illustrated, in the vacuum pump.

Since atmospheric pressure prevails in the vacuum-pump suction line and hence in partial-vacuum chamber 5, which communicates with it, when the pump is off, valve cone 7 is forced by its own weight and by compression spring 13 into restrictor 8, blocking it off. When the pump is turned on a partial vacuum is generated in the suction line and the partial vacuum migrates into partial-vacuum chamber 5 and the higher pressure in oil chamber 6 will force diaphragm 4 upward until the valve cone 7, that is attached to it, impacts against stop 10. Oil can now flow into catch chamber 1 through the resulting annular gap between valve cone 7 and restrictor 8 and through drop tube 9 and hence into oil drain 18 through filter 17. Oil flow can be varied by adjusting stop 10 along threaded section 11, with the desired rate maintained by counternut 12. Catch chamber 1 has a channel 14 leading to the atmosphere to prevent vacuum from building up inside the chamber and affecting the flow of oil.

When the vacuum pump is turned off, atmospheric pressure is established again in the suction line and hence also in partial-vacuum chamber 5, valve cone 7 blocks off restrictor 8, and the oil flow from catch chamber 1 is interrupted. Undesired filling up of catch chamber 1 with oil once the vacuum pump has been turned off and the associated overlubrication of the pump when it goes back into operation, which increases oil consumption, are accordingly prevented.

It will be appreciated that the instant specification and claims are set forth by way of illustration and not limitation, and that various modifications and changes may be made without departing from the spirit and scope of the present invention.

What is claimed is:

1. In an oil-flow regulator for a milking system vacuum pump, having an oil chamber receptive of oil through an oil line connected to a reservoir of nonpressurized free-flowing oil, an aerated catch chamber receptive of oil from the oil chamber, an oil line from the catch chamber for connecting to a vacuum pump and valve means for controlling the oil flow from the oil chamber to the catch chamber including a restrictor in communication with the oil chamber and the catch chamber and a valve cone for opening and closing the restrictor, the improvement wherein the valve means comprises a partial vacuum chamber including a diaphragm separating the partial vacuum chamber from the oil chamber, means connecting the valve cone to the diaphragm for up and down movement therewith toward and away from the restriction, means biasing the diaphragm and valve cone towards the restriction and wherein the partial vacuum chamber is connected to the vacuum pump to switch between atmospheric pressure therein when the pump is not in operation whereby the biasing means maintains the valve cone against the restrictor to close same and a partial vacuum therein when the pump is in operation, the partial vacuum being sufficient to overcome the biasing means to maintain the valve cone fully away from the restriction to open same.

2. The oil-flow regulator as in claim 1, wherein the valve means further comprises stop means for limiting the upward motion of the valve cone such that a desired amount of oil can flow through the restrictor.

3. The oil-flow regulator as in claim 2, wherein the valve-cone stop means includes means for axially displacing same to adjust the amount of flow.

4. The oil-flow regulator as in claim 1, wherein the biasing means comprises a compression spring biasing the valve cone towards the restrictor.

5. The oil-flow regulator as in claim 1, further comprising a filter in the catch chamber.

6. The oil-flow regulator as in claim 1, wherein the catch chamber is composed of a transparent material.

* * * * *